United States Patent [19]

Redikultsev et al.

[11] Patent Number: 4,510,249
[45] Date of Patent: Apr. 9, 1985

[54] APPARATUS FOR CHEMICAL FROTH SUPPRESSION IN A FERMENTER

[76] Inventors: Jury V. Redikultsev, Puschino, mikroraion "G", 19, kv. 113; Leonid A. Litvinenko, Puschino, mikroraion "AB", 8, kv. 74, both of Moskovskaya oblast, U.S.S.R.

[21] Appl. No.: 451,755

[22] Filed: Dec. 21, 1982

[30] Foreign Application Priority Data

Dec. 22, 1981 [SU] U.S.S.R. .............................. 3364403

[51] Int. Cl.³ .............................................. C12M 1/36
[52] U.S. Cl. .................................... 435/289; 435/812; 55/178; 202/264
[58] Field of Search ................ 252/361; 435/812, 287, 435/289; 55/178, 87; 202/264

[56] References Cited

U.S. PATENT DOCUMENTS 3,425,952  2/1969  Gaughan et al. ................... 252/361
3,806,423  4/1974  Karrenbauer et al. .......... 435/289 X
4,080,258  3/1978  McAleer et al. ................. 435/285 X
4,302,545  11/1981 Redikultsev et al. ............ 252/361 X

FOREIGN PATENT DOCUMENTS 0485423  9/1975  U.S.S.R. .

Primary Examiner—Esther M. Kepplinger
Assistant Examiner—Randall E. Deck
Attorney, Agent, or Firm—Burgess, Ryan & Wayne

[57] ABSTRACT

An apparatus for chemical froth suppression in a fermenter comprises a vessel containing a chemical froth suppressor and communicating via a pressure pipe with the fermenter. The pressure pipe has arranged at a preselected level with respect to the froth height a nozzle intended to form a jet of froth suppressor which enters a chamber through an inlet port thereof. This chamber is accommodated inside the fermenter substantially above the level of froth therein. The jet of froth suppressor is reflected from the concave wall of the chamber to be conveyed along the discharge pipe by a pneumatic or suction pump into the vessel containing the froth suppressor. The discharge pipe is provided at tne end thereof inside the vessel with a nozzle intended to form a jet of the chemical froth suppressor flowing along this discharge pipe into the vessel. A gas zone of the vessel containing the chemical froth suppressor is communicable with a gas zone of the fermenter by a pipe having provided therein a throttle means serving to maintain a required pressure inside the pressure pipe.

1 Claim, 1 Drawing Figure

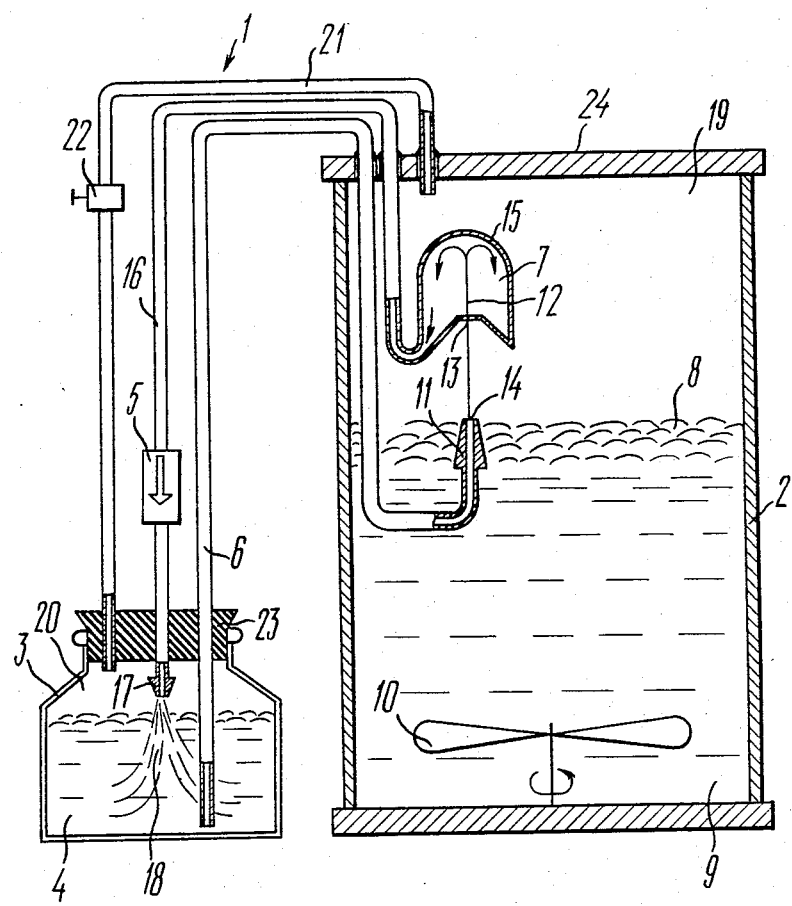

APPARATUS FOR CHEMICAL FROTH SUPPRESSION IN A FERMENTER

FIELD OF THE INVENTION

This invention relates to apparatus for chemical froth suppression, and more particularly to apparatus for chemical froth suppression in a fermenter.

The invention can find application in the microbiological, medical and chemical industries, as well as in research practice.

BACKGROUND OF THE INVENTION

Steady froth formation is an undesirable phenomenon occuring in aerating media containing organic matter. Stability of froth is associated with the composition of complex media or products of metabolism of microorganisms which are not identified in many instances, and the fight against froth formation is frequently conducted on an empirical basis.

Negative effect of froth formation consists in the following:

a culture with froth may be let out of the fermenter through outlet ports;

the value of $KL_a$ (efficiency of oxygen absorption) decreases;

in chemostatic cultures (cultures with complete stirring to which a culture medium is added at a constant rate and from which a culture is withdrawn at the same rate while retaining the total volume unchanged) the gas content varies, hence the liquid volume of the culture medium becomes uncontrollable.

There is known an interface controller between two liquid media in a vessel used in a process of microbiological synthesis for suppressing froth in a fermenter by surface-active substances (froth suppressors) as exemplified in USSR Inventor's Certificate No. 485,423, [IPC C 05 d 9/12].

The above controller comprises a throttle installed in the interior of the fermenter at a preselected froth level and connected by a pipe to a comparator to control the feed rate of the froth suppressor into the fermenter. Another pipe connecting the comparator with the fermenter accommodates a pump providing for closed circulation of a gas mixture. The controller also comprises a vessel containing the froth suppressor and a pipe having a means for controlling the rate of feed of the froth suppressor from the vessel to the fermenter when an error signal is received by the comparator.

The aforedescribed apparatus operates as follows.

When froth in the fermenter is short of coming into contact with a throttle port, the pump acts to force the gas mixture via the throttle and the comparator from the fermenter and return the mixture back to the fermenter, the comparator remaining unengaged.

Conversely, when the froth reaches the throttle port, it is pumped by the pump whereby resistance in the throttle tends to increase sharply to result in an error signal received by the comparator which issues a control signal to the means for controlling the rate of feed of the froth suppressor for more froth suppressor to be fed to the fermenter.

The froth suppressor which is conveyed to the fermenter acts to suppress the froth thereby relieving the throttle port of the froth to result in a reduced flow resistance therein, the comparator assuming its initial state. Therewith, the means for controlling the feed rate of the froth suppressor terminates the supply of the froth suppressor to the fermenter.

The above apparatus may be employed both in large-scale production fermenters and in laboratories.

Inherent in such apparatus are disadvantages residing in that the provision for gas circulation through the comparator constituting a focal point of microorganism decay upsets the aseptic conditions for carrying out a microbiological process. In addition, supply of the froth suppressor by samples into the fermenter tends to result in overconsumption of the froth suppressor, since froth formation during a fermentation process is normally not programmable. On the other hand, the froth suppressor in the vessel is susceptible to stratification due to lack of stirring whereby froth suppression in the fermenter may be affected.

There is further known an apparatus for chemical froth suppression in a fermenter comprising a vessel containing a chemical froth suppressor fed to the fermenter by a pneumatic pump along a pressure pipe adapted to connect the vessel containing the froth suppressor with the fermenter, a nozzle disposed inside the fermenter at a preselected level of froth therein and connected by the pressure pipe with the vessel containing the chemical froth suppressor, the nozzle serving to form a jet of the froth suppressor for this jet to be received by an inlet port of a chamber accommodated in the interior of the fermenter, the inlet port being disposed coaxially with an outlet opening of the nozzle, a wall of the chamber opposite to the inlet port thereof being concaved to reflect the jet of froth suppressor escaping from the nozzle for the thus reflected froth suppressor to be sucked off and conveyed to the vessel containing the froth suppressor along a discharge pipe connecting this chamber with the froth suppressor containing vessel, and a throttle means serving to maintain a required pressure in the pressure pipe (cf. U.S. Pat. No. 4,302,545, Cl. [435-289].

In the above apparatus the pneumatic pump is arranged in the pressure pipe, while the throttle and the nozzle are positioned in succession downstream of the chemical froth suppressor subsequent to the pneumatic pump in the pressure pipe. This arrangement provides for a gravity drain of the froth suppressor into the vessel containing the chemical froth suppressor along the discharge pipe.

Discharge of the froth suppressor by gravity from the chamber causes suction or underpressure resulting in air bubbles affecting the rate at which the froth suppressor is withdrawn from the chamber which in turn may cause overflow of the chamber with the chemical froth suppressor and accidental discharge thereof through the inlet port of the chamber back into the fermenter.

The gravity drain of the chemical froth suppressor also fails to provide a sufficiently vigorous stirring thereof which may result in stratification, clogging of the throttle and loss of control over froth suppression.

One more disadvantage is that the gravity discharge of the chemical froth suppressor limits structural and operational capabilities of the apparatus requiring a careful selection of the flow area and height of the discharge pipe depending on the viscosity of the chemical froth suppressor employed.

The use of the discharge pipe for two purposes, particularly for discharging the chemical froth suppressor and equalizing pressure in the fermenter and the vessel containing the chemical froth suppressor affects the reliability of the apparatus. For example, when pressure in the fermenter drops due to reduced air supply for aeration, this pressure tends to equalize subsequent to the overflow of air along the discharge pipe from the vessel containing the chemical froth suppressor into the fermenter which may result in an accidental discharge of the froth suppressor into the fermenter.

Further, the arrangement of the throttle in the pressure pipe downflow of the pneumatic pump produces an overpressure in the pressure pipe which makes pressure sealing of the apparatus more complicated, affects operation of the pneumatic pump and brings down its operational reliability.

SUMMARY OF THE INVENTION

It is an object of this invention to prevent discharge of the chemical froth suppressor into the fermenter without the froth affecting the jet of froth suppressor.

Another object is to provide mixing of the chemical froth suppressor in a vessel containing the froth suppressor to prevent stratification thereof.

One more object is to prevent the chemical froth suppressor from flowing along the discharge pipe back into the fermenter due to pressure variations in the fermenter.

Yet another object is to improve the operational reliability of the apparatus for chemical froth suppression in a fermenter.

The objects are attained by that in an apparatus for chemical froth suppression in a fermenter comprising a vessel containing a chemical froth suppressor fed to the fermenter by a pneumatic pump along a pressure pipe connecting the vessel containing the chemical froth suppressor with the fermenter, a nozzle disposed inside the fermenter at a preselected level of froth and connected by the pressure pipe with the vessel containing the chemical froth suppressor to form a jet of the froth suppressor and withdraw the froth suppressor through an inlet port of a chamber accommodated inside the fermenter coaxial with an outlet opening of the nozzle into this chamber a wall of which opposite to the inlet port is concaved to reflect the jet of the froth suppressor and convey it into the vessel containing the froth suppressor along a discharge pipe connecting the chamber with the vessel containing the chemical froth suppressor, and a throttle intended to maintain a required pressure in the pressure pipe, according to the invention, the pneumatic pump is disposed in the discharge pipe for sucking the chemical froth suppressor from the chamber, while there are provided one more nozzle arranged on the discharge pipe in the vessel containing the chemical froth suppressor to form a jet of the chemical froth suppressor conveyed along the discharge pipe into the vessel containing the chemical froth suppressor and one more pipe communicating a gas zone of the fermenter with a gas zone of the vessel containing the chemical froth suppressor, a throttle being disposed in this pipe to stabilize pressure in the vessel containing the chemical froth suppressor during circulation therethrough by means of the pneumatic pump of the chemical froth suppressor to maintain thereby a required pressure in the pressure pipe.

Such an arrangement of the apparatus for chemical froth suppression in a fermenter enables one to prevent discharge of the chemical froth suppressor into the fermenter without affecting the jet of froth suppressor, mix the chemical froth suppressor in the vessel containing the chemical froth suppressor to prevent stratification thereof, prevent penetration of the chemical froth suppressor along the discharge pipe into the fermenter caused by pressure variations therein, improve the operational reliability of the apparatus, prevent overconsumption of the costly chemical froth suppressor, and use the apparatus embodying the invention in fermenters of various size, including large-scale production industrial fermenters. The apparatus according to the invention further makes it possible to control the flow of the chemical froth suppressor consumed during fermentation without accidentally discharging the chemical froth suppressor to the fermenter.

BRIEF DESCRIPTION OF THE ACCOMPANYING DRAWINGS

The invention will now be described in greater detail with reference to a specific embodiment thereof taken in conjunction with the accompanying drawings the sole FIGURE of which illustrates schematically a longitudinal sectional view of an apparatus for chemical suppression of froth in a fermenter.

DETAILED DESCRIPTION OF THE INVENTION

An apparatus 1 for chemical froth suppression in a fermenter 2 comprises a vessel 3 containing a chemical froth suppressor 4 which is fed into the fermenter 2 by means of a pneumatic pump 5 along a pressure pipe 6 communicating the vessel 3 containing the chemical froth suppressor 4 with the fermenter 2.

The apparatus 1 further comprises accommodated inside the fermenter 2 a chamber 7 arranged to overlie froth 8 formed therein as a result of a fermentation process occuring in a culture medium 9 stirred by a stirrer 10 of the fermenter 2, and a nozzle 11 positioned at a preselected level of the froth 8, the nozzle 11 being connected by the pressure pipe 6 with the vessel 3 containing the chemical froth suppressor 4 to feed the froth suppressor 4 through an inlet port 13 of the chamber 7 into this chamber 7. An outlet opening 14 of the nozzle 11 is arranged coaxially with the inlet port 13 of the chamber 7. A wall 15 of the chamber 7 opposite to the inlet port 13 of the chamber 7 is concave (hereinafter referred to as the concave wall 15) to reflect a jet of the chemical froth suppressor 4 to convey the latter into the vessel 3 along a discharge pipe 16 communicating the chamber 7 with the vessel 3.

The pneumatic pump 5 is arranged in the discharge pipe 16 to suck the chemical froth suppressor 4 from the chamber 7. The discharge pipe 16 is provided with a nozzle 17 letting out into the interior of the vessel 3 and intended to produce a jet 18 of the chemical froth suppressor 4 conveyed along the discharge pipe 16 to the vessel 3.

A gas zone 19 of the fermenter 2 occupying a space above the froth 8 is communicable with a gas zone 20 of the vessel 3 containing the chemical froth suppressor 4, this gas zone occupying a space in the vessel 3 above the level of the froth suppressor 4 by way of a pipe 21 having a throttle 22 to maintain a stable preselected pressure in the vessel 3 when the pneumatic pump 5 acts to charge thereinto and discharge therefrom the chemical froth suppressor 4 and to thereby maintain a required pressure in the pressure pipe 6.

The pipes 6, 16 and 21 are secured in the vessel 3 by means of a rubber plug 23 and introduced into the fermenter 2 through its cover plate 24.

The apparatus 1 for chemical suppression of froth in a fermenter 2 operates in the following manner.

Initially, the vessel 3 is filled with the chemical froth suppressor 4 and hermetically sealed by the rubber plug 23, the nozzle 11 of the apparatus 1 being positioned in the gas zone 19 of the fermenter 2 at a preselected level of the froth 8. The pneumatic pump 5 is engaged whereafter by manipulating the throttle 22 a required pressure is set in the vessel 3 containing the chemical froth suppressor 4, which froth suppressor 4 when acted upon by this pressure is caused to be conveyed toward the nozzle 11 and escape from its outlet opening 14 to form a jet 12 which without touching the edges of the opening 13 of the chamber enters thereinto and after being thrust against the concave wall 15 thereof is sucked away by the pneumatic pump 5 along the discharge pipe 16 back into the vessel 3. While escaping through the nozzle 17 the froth suppressor 4 forms the jet 18 acting on the froth suppressor contained in the vessel 3 to actively mix it to prevent stratification.

A positive pressure in the vessel 3 containing the chemical froth suppressor 4 which is produced during operation of the pneumatic pump 5 is restored by the throttle 22 by a gas overflow via the pipe 21 connecting the gas zone 19 of the fermenter 2 with the gas zone 20 of the vessel 3.

Froth is continuously produced in the course of stirring the culture medium 9 by the stirrer 10. Therewith, the froth tends to rise above the opening 14 of the nozzle 11 to thereby come into contact with the jet 12 of the chemical froth suppressor 4. At this point, adhesive forces cause the jet 12 of the chemical froth suppressor 4 to deflect or deviate to be discharged into the layer of froth 8 rather than enter the inlet port 13 to thereby suppress the froth resulting in bringing down the level of froth for the jet 12 to come out of engagement with the froth 8 and start again entering the port 13 of the chamber 7 thereby recommencing the closed circulation of the froth suppressor 4.

The apparatus according to the invention provides a self-controllable process of froth tracing and froth suppression by a chemical froth suppressor accompanied by rationing the amount of chemical froth suppressor expended for suppressing the froth depending on the rate of froth formation and the stability of the froth to the effect produced by the chemical froth suppressor employed.

In addition, the suction of froth suppressor from the chamber and the provision of a throttle means in a pipe enabled to have the working assembly of the apparatus, particularly the chamber, the nozzle, the pressure and discharge pipes, be embodied as a cylindrical rod-like member easily insertable into a fermenter through the cover plate thereof and adjustable in height.

Specific and narrow terminology has been used for the sake of clarity in the description of the present invention. The invention is not, however, limited by the terms employed, and it stands to reason that each term covers every equivalent element having a similar function and used for accomplishing the same object.

Though the invention has been described as applied to the preferred embodiments thereof, it is understood that various alternative modifications and changes may be introduced without departing from the spirit and scope of the invention as will be readily apparent to those skilled in the art.

Such modifications and changes will be considered as not deviating from the spirit and scope of the appended claims.

What is claimed is:

1. An apparatus for chemical froth suppression comprising:
    a fermenter;
    a vessel containing a chemical froth suppressor;
    a pressure pipe connecting said vessel with said fermenter;
    a first nozzle having an outlet opening and disposed in said fermenter, said nozzle being positioned on said pressure pipe at a preselected level of said froth so as to form a jet of froth suppressor which escapes through said outlet opening;
    a chamber accommodated inside said fermenter above the level of said froth and having an inlet port coaxial with said outlet opening of said nozzle for said jet of froth suppressor escaping from said outlet opening to enter said inlet port, said chamber having an outlet, and a concave wall opposite to said inlet port for reflecting said jet of froth suppressor which enters said chamber through said inlet port thereof to said outlet;
    a discharge pipe connecting the outlet of said chamber with said vessel containing said chemical froth suppressor to withdraw said jet of froth suppressor reflected from said concave wall and convey it to said vessel;
    a pneumatic pump disposed in said discharge pipe to suck said chemical froth suppressor from said chamber;
    a second nozzle secured on said discharge pipe in said vessel containing said chemical froth suppressor to form a jet of said chemical froth suppressor flowing along said discharge pipe into said vessel containing said chemical froth suppressor;
    a third pipe communicating a gas zone of said fermenter overlying said froth with a gas zone of said vessel containing said chemical froth suppressor overlying the level of said chemical froth suppressor; and
    a throttle means disposed in said third pipe and serving to maintain a predetermined pressure in said vessel containing said chemical froth suppressor during circulation therethrough by said pneumatic pump of said chemical froth suppressor to maintain thereby a required pressure in said pressure pipe.

* * * * *